United States Patent [19]

McLeod

[11] 4,397,136

[45] Aug. 9, 1983

[54] AGRICULTURAL SLASHER

[76] Inventor: Leon G. McLeod, 5 Frangela Dr., Murwillumbah, Australia, 2484

[21] Appl. No.: 286,515

[22] Filed: Jul. 24, 1981

Related U.S. Application Data

[63] Continuation of Ser. No. 19,044, Mar. 9, 1979, abandoned.

[51] Int. Cl.³ .................................................. A01D 49/00
[52] U.S. Cl. .......................................... 56/500; 56/60;
                                                                           56/503
[58] Field of Search ............... 56/503, 500, 51, 53, 56/60, 13.6, 13.7, 295

[56] References Cited

U.S. PATENT DOCUMENTS

| | | | |
|---|---|---|---|
| 306,771 | 10/1884 | Pierson | 56/60 |
| 370,616 | 9/1887 | Gilpin et al. | 56/53 |
| 1,782,560 | 11/1930 | Benjamin | 56/60 |
| 1,901,310 | 3/1933 | Lewis | 56/503 |
| 1,945,733 | 2/1934 | Court | 56/60 |
| 2,612,017 | 9/1952 | Jarmin | 56/503 |

*Primary Examiner*—Jay N. Eskovitz
*Attorney, Agent, or Firm*—Schwartz, Jeffery, Schwaab, Mack, Blumenthal & Koch

[57] ABSTRACT

An agricultural slasher for cutting bushy plants, such as cotton plants, after harvesting, has a tractor-mounted main frame carrying a series of parallel laterally spaced driven cutter shafts inclining from bottom to top in the direction of travel, each carrying, one above the other, a series of rotary cutters each having a number of radiating blades. Guides on the main frame define guideways to guide plants to be slashed, as the main frame is advanced, towards the rotary cutters which co-act, near to the rear of the guideways, with fixed cutters on the main frame. The inclined assemblies of rotary cutters, coacting with the fixed cutters, cut the branches of the bushes into small pieces before the trunks of the bushes are severed near ground level, and the lowermost of the rotary cutter blades penetrate the soil and chop the roots of the bushes.

9 Claims, 3 Drawing Figures

AGRICULTURAL SLASHER

This is a continuation of application Ser. No. 019,044 filed Mar. 9, 1979 and now abandoned.

BACKGROUND OF THE INVENTION

This invention relates to an agricultural slasher, particularly for cutting row crops, after harvesting, into small pieces, to serve as a stubble mulch, and so that cultivation may be carried out without difficulties.

In certain crops, notably cotton, the plants have tough stems, the branches spread fairly widely, and the roots are large. A conventional slasher can cut the bushes down, but the branches are not cut into small pieces by these implements, and the roots remain in the soil and must subsequently be removed by rippers.

The present invention has been devised with the general object of providing an agricultural slasher which is capable of chopping bushes into small pieces to serve as a mulch, and which will also chop through the roots of the bushes, to reduce difficulties in subsequent cultivation.

BRIEF SUMMARY OF THE INVENTION

An agricultural slasher according to the invention has a main frame which may be made for connection behind a tractor, and which has mounted on it at least one rotary cutter shaft inclining, from bottom to top, in the direction of travel, and driven by any suitable power source. Mounted on the cutter shaft are a number of rotary cutters, one above the other, each having radiating blades which, excepting those of the bottom one or more of the cutters, coact with fixed blades on the main frame to chop branches into small pieces, the lower blades being arranged to cut through the trunks of bushlike plants near ground level, and also to enter the soil to chop roots into pieces. Owing to the inclination of the chopper shaft, most of the branches of a plant, including those on its far side, are cut into small pieces before the trunk is cut through. Preferably there are a number of the cutter shafts, with associated rotary cutters and fixed cutter blades, mounted adjacently on the main frame, and preferably guides on the main frame guide and compress the plants into restricted guideways at the rear of which the rotary blades coact with the fixed blades.

BRIEF DESCRIPTION OF THE DRAWINGS

A preferred embodiment of the invention is shown in the accompanying drawings, wherein.

DESCRIPTION OF THE PREFERRED EMBODIMENT

Figure 1:
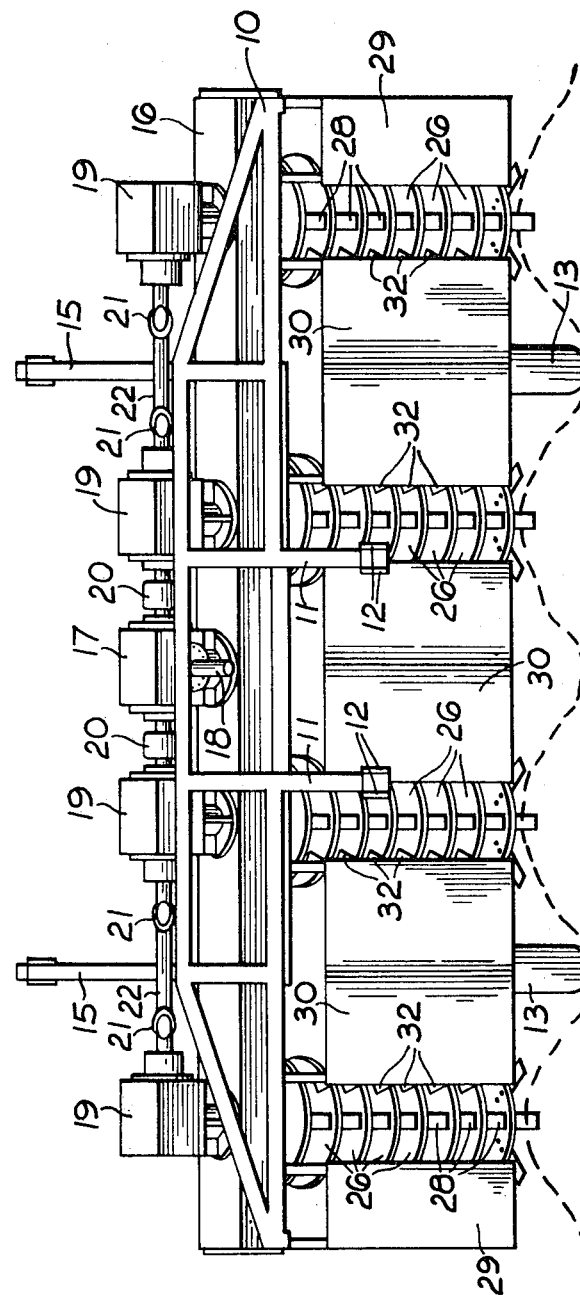
FIG. 1 is front elevational view of a slasher according to the invention.

The slasher shown in the drawings includes a main frame 10 including a pair of front upright members 11, each having at its lower end a pair of forwardly extending apertured lugs 12 for connection to the lift arms of a tractor's three-point lifting gear (not shown). The main frame is supported at the rear by a pair of castor-wheels 13 carried at the rear ends of a pair of A-frames 14 each of which is pivoted at its front ends to the main frame and is maintained in desired pivotally adjusted position by a strut 15a depending from the rear end of an arm 15 inclining upwardly and rearwardly from the main frame. The main frame 10 is not connected to the top central arm of the tractor's three-point linkage, and is not likely to require much height adjustment for operation or travelling along roads, but its height may be adjusted to a limited extent by raising and lowering the tractor's side lifting arms, and also by varying the attachment of the struts 15a to the A-frames 14.

A gearbox mounting member 16 is mounted transversely on the main frame 10, and has mounted thereon a central gearbox 17, of which the input shaft 18 may be connected by an assembly (not shown) of universal couplings and a telescopically adjustable shaft to the power take-off shaft (not shown) of the tractor to which the implement is hitched.

To each side of the central gearbox 17, a pair of drive gearboxes 19 are mounted on the mounting member 16, the four drive gearboxes being in equally spaced arrangement and laterally aligned with the central gearbox to which they are operatively connected through flexible chain couplings 20, universal couplings 21 and shafts 22.

The gearbox mounting member 16 is mounted on the main frame 10 obliquely, in side view, so that the equally spaced and parallel downwardly extending output shafts 23 of the drive gearboxes 19 are all inclined forwardly from bottom to top. The bottom ends of these shafts are rotatably mounted in bearings (not shown), those of the two outer shafts 23 being mounted on side bearing brackets 24 at the sides of the lower rear part of the main frame 10, those of the two inner shafts being mounted on a central bearing bracket 25 which is T-shaped in plan view.

On each of the shafts 23 there are mounted a number of rotary cutters 26, each consisting of a disc with a coaxial spaced hub 27 and with a number of equally spaced radiating cutter blades 28. The lowermost rotary cutter on each shaft is provided with eight blades, the other cutters on the shaft each having four blades.

Figure 3:
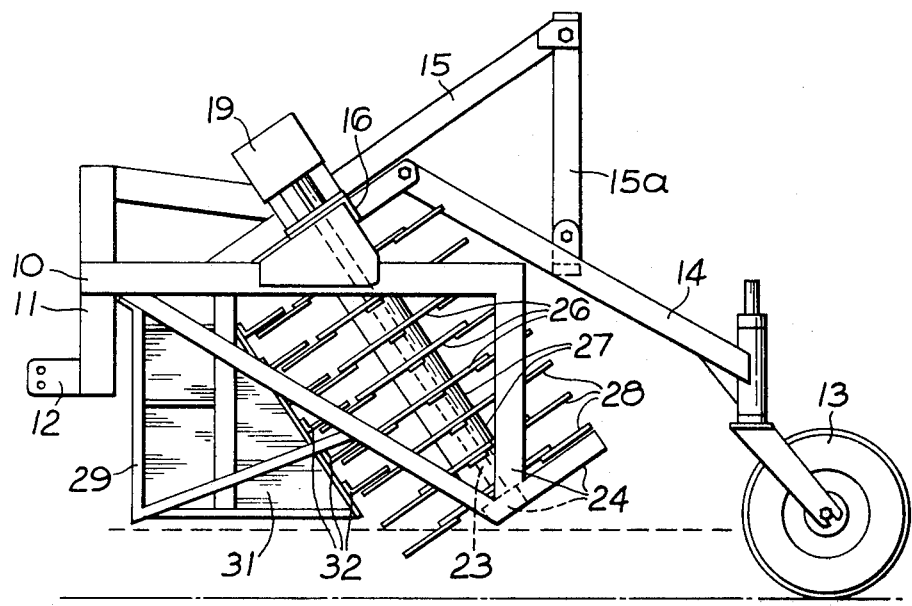
FIG. 3 is a side elevational view of the slasher.

Two outer guide plates 29 and three inner guide plates 30 are mounted below the front of the main frame, the outer plates being angled to the direction of travel, the inner plates being V-shaped in plan view, so that the arrangement of inner and outer guide plates form guideways, each rearwardly convergent to one of the series of rotary cutters 26. The rear ends of all of the guide plates 29 and 30 have substantially triangular rearward extensions 31, their rear edges being inclined, in side view, correspondingly to the rotary cutters, as shown in FIG. 3.

Figure 2:
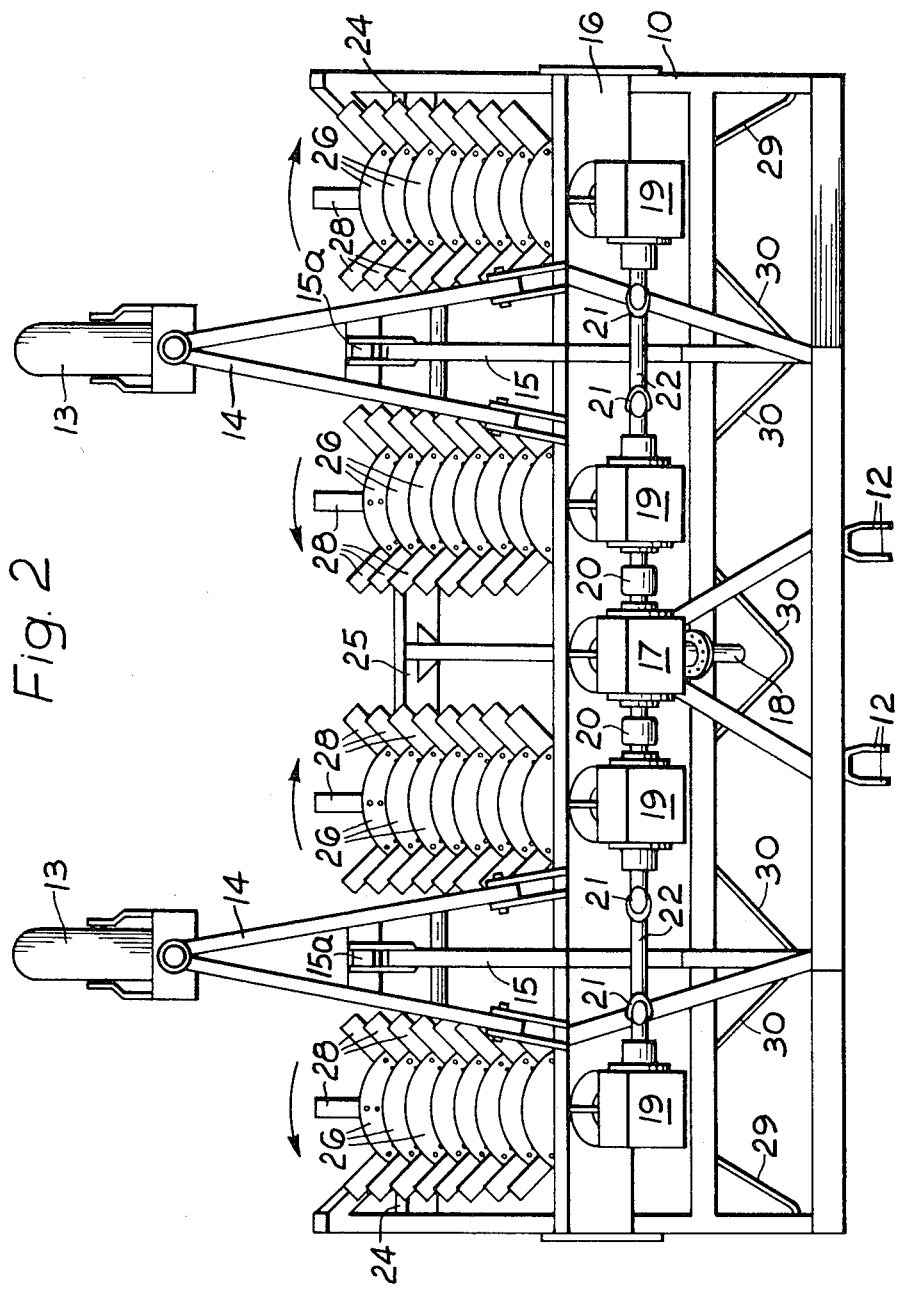
FIG. 2 is a plan view of the slasher.

Each of the drive gearboxes is of reversing type, so that the direction of rotation of the four series of rotary cutters alternates, as indicated by arrows in FIG. 2.

On the oblique rear edges of the triangular extensions 31 of the two inner guide plates 30 which are nearer to the sides of the main frame there are mounted series of fixed cutter blades 32, these being so made and arranged that when the rotary cutters 26 are rotated, the cutter blades 28 of each series, excepting the cutter blades of the two lowermost of the rotary cutters of the series, pass closely under fixed cutter blades 32, the rotary and fixed cutter blades coacting to effect a scissor-like cutting effect.

The slasher may be drawn by a tractor along an area of cotton bushes, for example, after harvesting. The plants are hilled-up, and the castor wheels 13, which are spaced similarly to the wheels of the tractor, travel in furrows between the raised rows of plants, the profile of the ground being more or less as indicated in broken outline in FIG. 1. As the slasher is advanced, the rotary cutters driven, the plants of four succeeding rows are compressed in the guideways between the guide plates 29 and 30. Each of the inclined series of rapidly driven rotary cutters 26, the blades 28 of all but the lowermost two coacting with the fixed cutter blades 32, will cut the branches and twigs of the bushes into small fragments, the rotary cutter second from the bottom cutting through the main stems of the bushes near to ground level, and the lowermost of the rotary cutters, with its extra cutter blades, entering into the soil to cut the roots into small pieces. The inclination of each series of rotary cutters ensures that in general the branches of each bush are cut into pieces before the main stem is cut through at or near to ground level. The branches may, of course, be more effectively cut into pieces while supported by the main stem. The inclined arrangement of the rotary cutters also enables the roots to be cut into pieces, greatly facilitating subsequent cultivation of the area.

Agricultural slashers according to the invention will be found to be very effective in achieving the objects for which they have been devised. It will, of course, be understood that the particular embodiment of the invention herein described and illustrated may be subject to many modifications of constructional detail and design, which will be readily apparent to skilled persons, without departing from the scope of the invention hereinafter claimed.

I claim:

1. An agricultural slasher of the type having a tractor-mounted main frame, a cutter shaft mounted rotatably on the frame, means for driving the cutter shaft, and a series or rotary cutters on the cutter shaft, wherein:

the cutter shaft inclines upwardly from bottom to top in the direction of travel so as to permit branches of a plant to be cut into relatively small pieces before a trunk of the plant is cut through, the rotary cutters comprise blades radiating, at axially spaced intervals, from the cutter shaft and being unguarded and fully exposed around the entire circumference thereof, the lowermost cutters of said series of rotary cutters extending below the main frame on which fixed cutters are mounted so as not to coact with said fixed cutters, at least one bottom cutter of said lowermost cutters being positioned on said shaft so as to penetrate the earth during rotation thereof thereby serving to cut roots of the plant, said at least one bottom cutter being provided with a greater number of blades than the cutters mounted thereabove, the blades of the rotary cutters, other than said lowermost cutters, being positioned to pass closely adjacent said fixed cutters and coacting therewith when the cutter shaft is driven to finely chop the plant including the trunk.

2. An agricultural slasher according to claim 1 wherein said at least one bottom cutter is provided with eight radially extending and arcuately spaced blades and the remainder of said cutters are provided with four blades.

3. An agricultural slasher according to claim 1 wherein:

a series of the cutter shafts are mounted in laterally spaced parallel arrangement on the main frame, each with radiating rotary cutter blades in axially spaced arrangement adapted to coact with a series of fixed cutters on the main frame.

4. An agricultural slasher according to claim 1 wherein:

guides are mounted on the main frame and define a guide-way to guide the plants to be slashed, as the main frame is advanced, towards the rotary cutters, the fixed cutters being so located that rotary cutter blades coact therewith at or near to the end of their movement past the guide-way.

5. An agricultural slasher including:

a main frame, means for connecting the main frame, at its front, to a tractor, a laterally aligned series of spaced parallel rotary cutter shafts mounted on the main frame, all inclining forwardly from bottom to top so as to permit branches of a plant to be cut into relatively small pieces before a trunk of the plant is cut through, a series of rotary cutters with radiating blades mounted in spaced coaxial arrangement on each of the rotary cutter shafts and being unguarded and fully exposed around the entire circumference thereof, and lowermost cutters of said series of rotary cutters extending below the main frame on which fixed cutters are mounted so as not to coact with said fixed cutters, at least a bottom cutter of said lowermost cutters being positioned on said shaft so as to penetrate the earth during rotation thereof thereby serving to cut roots of the plant, said at least one bottom cutter being provided with a greater number of blades than the rotary cutters mounted thereabove, drive means for simultaneously rotating all of the rotary cutter shafts, guide means on the main frame defining guideways such that, as the main frame is advanced, plants engaged by the guide plates are guided through the guide-ways to the series of rotary cutters, said fixed cutters being mounted on the main frame adjacent to the guide-ways, the rotary cutter blades being positioned to pass closely adjacent said fixed cutters and coacting therewith to finely chop the plants, including the trunk, guided through the guide-ways.

6. An agricultural slasher according to claim 5 wherein said at least one cutter is provided with eight radially extending and arcuately spaced blades and the remainder of said cutters are provided with four blades.

7. An agricultural slasher according to claim 6 wherein each rotary cutter comprises a disc and a coaxial hub, said rotary hubs serving to space said cutters on said shaft.

8. An agricultural slasher according to claim 5 wherein said guide means comprise outer and inner guide plates mounted on said frame and inclined adjacent said rotary cutters at substantially the same angle as said rotary cutters, the edges of associated plates terminating closely adjacent said rotary cutters whereby plants are guided and compressed by said guide plates directly into said rotary cutters.

9. An agricultural slasher according to claim 1 wherein said guides comprise outer and inner guide plates mounted on said frame and inclined towards said rotary cutters, the edges of associated plates terminating closely adjacent said rotary cutters whereby said plants are guided and compressed by said guide plates into said rotary cutters.

* * * * *